United States Patent
Briscoe et al.

(10) Patent No.: US 10,645,016 B2
(45) Date of Patent: May 5, 2020

(54) DATA PACKET NETWORK

(71) Applicant: BRITISH TELECOMMUNICATIONS PUBLIC LIMITED COMPANY, London (GB)

(72) Inventors: Robert Briscoe, London (GB); Philip Eardley, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 0 days.

(21) Appl. No.: 15/746,976

(22) PCT Filed: Jun. 16, 2016

(86) PCT No.: PCT/EP2016/063867
§ 371 (c)(1),
(2) Date: Jan. 23, 2018

(87) PCT Pub. No.: WO2017/021046
PCT Pub. Date: Feb. 9, 2017

(65) Prior Publication Data
US 2019/0014051 A1    Jan. 10, 2019

(30) Foreign Application Priority Data
Aug. 6, 2015  (EP) .................................. 15180017

(51) Int. Cl.
*H04L 12/835* (2013.01)
*H04L 12/851* (2013.01)
(Continued)

(52) U.S. Cl.
CPC ............ *H04L 47/30* (2013.01); *H04L 47/115* (2013.01); *H04L 47/193* (2013.01);
(Continued)

(58) Field of Classification Search
None
See application file for complete search history.

(56) References Cited

U.S. PATENT DOCUMENTS

| | | | |
|---|---|---|---|
| 6,128,642 A | 10/2000 | Doraswamy et al. | |
| 6,188,698 B1 * | 2/2001 | Galand ................... | H04L 47/10 370/229 |

(Continued)

FOREIGN PATENT DOCUMENTS

| | | |
|---|---|---|
| CN | 1545286 | 11/2004 |
| CN | 101034346 | 9/2007 |

(Continued)

OTHER PUBLICATIONS

International Search Report and Written Opinion of the ISA for PCT/EP2016/063867, dated Aug. 31, 2016, 11 pages.

(Continued)

*Primary Examiner* — Faruk Hamza
*Assistant Examiner* — Cassandra L Decker
(74) *Attorney, Agent, or Firm* — Nixon & Vanderhye P.C.

(57) ABSTRACT

The invention relates to a method of controlling packets in a data packet network, the method comprising the steps of: a source node sending a first set of packets to a receiver node over the data packet network via an intermediate node, wherein the first set of packets are marked as being of a class of service preventing them from being forwarded to the receiver node if a packet queue exists at an intermediate node; the source node receiving an acknowledgement of a received packet of the first set of packets from the receiver node; and the source node sending a second set of packets to the receiver node over the data packet network.

15 Claims, 11 Drawing Sheets

(51) Int. Cl.
*H04L 12/823* (2013.01)
*H04L 12/825* (2013.01)
*H04L 12/801* (2013.01)

(52) U.S. Cl.
CPC .......... *H04L 47/2408* (2013.01); *H04L 47/25* (2013.01); *H04L 47/32* (2013.01); *H04L 47/37* (2013.01)

(56) References Cited

U.S. PATENT DOCUMENTS

| | | | |
|---|---|---|---|
| 6,215,769 B1 | 4/2001 | Ghani et al. | |
| 6,252,848 B1 | 6/2001 | Skirmont | |
| 6,317,416 B1 | 11/2001 | Giroux et al. | |
| 6,618,378 B1 | 9/2003 | Giroux et al. | |
| 6,646,987 B1 | 11/2003 | Qaddoura | |
| 6,788,697 B1* | 9/2004 | Aweya | H04L 49/90 370/235 |
| 6,839,321 B1 | 1/2005 | Chiruvolu | |
| 7,095,750 B2 | 8/2006 | Craddock et al. | |
| 7,266,612 B1* | 9/2007 | Heyman | H04L 45/00 370/229 |
| 7,324,535 B1 | 1/2008 | Goss et al. | |
| 7,372,865 B2 | 5/2008 | Scott et al. | |
| 7,680,038 B1 | 3/2010 | Gourlay | |
| 9,231,737 B1* | 1/2016 | Feng | H04L 1/1692 |
| 9,860,184 B2 | 1/2018 | Briscoe | |
| 2002/0078164 A1 | 6/2002 | Reinschmidt | |
| 2002/0080768 A1 | 6/2002 | Garcia-Luna-Aceves et al. | |
| 2002/0097719 A1 | 7/2002 | Chaskar et al. | |
| 2002/0114340 A1 | 8/2002 | Kumazawa et al. | |
| 2003/0007454 A1 | 1/2003 | Shorey | |
| 2003/0120795 A1 | 6/2003 | Reinshmidt | |
| 2004/0095935 A1 | 5/2004 | Connor | |
| 2004/0218617 A1 | 11/2004 | Sagfors | |
| 2005/0135248 A1 | 6/2005 | Ahuja et al. | |
| 2005/0190779 A1 | 9/2005 | Hoffman et al. | |
| 2006/0013241 A1* | 1/2006 | Yamatsu | H04L 47/10 370/401 |
| 2006/0067325 A1 | 3/2006 | Kounavis et al. | |
| 2006/0072628 A1 | 4/2006 | Liu et al. | |
| 2006/0184664 A1 | 8/2006 | Jung | |
| 2006/0262720 A1 | 11/2006 | Charny et al. | |
| 2007/0006229 A1 | 1/2007 | Moore | |
| 2007/0047446 A1 | 3/2007 | Dalal et al. | |
| 2007/0081454 A1 | 4/2007 | Bergamasco et al. | |
| 2008/0002790 A1* | 1/2008 | Itoh | H04L 1/0003 375/317 |
| 2008/0120389 A1* | 5/2008 | Bassali | G06F 5/14 709/207 |
| 2008/0298391 A1 | 12/2008 | Feroz et al. | |
| 2009/0003369 A1 | 1/2009 | Lundin | |
| 2009/0172210 A1* | 7/2009 | Kesselman | H04L 47/805 710/16 |
| 2009/0232001 A1 | 9/2009 | Gong et al. | |
| 2009/0268706 A1* | 10/2009 | Featherstone | H04L 1/187 370/345 |
| 2010/0008228 A1* | 1/2010 | Chakravorty | H04L 47/10 370/236 |
| 2010/0278042 A1 | 11/2010 | Monnes et al. | |
| 2010/0302946 A1* | 12/2010 | Yang | H04B 7/155 370/235 |
| 2011/0211450 A1* | 9/2011 | Meloche | H04L 41/5025 370/235 |
| 2012/0176903 A1* | 7/2012 | Kastenholtz | H04L 47/12 370/237 |
| 2013/0044598 A1 | 2/2013 | Zhang et al. | |
| 2013/0058214 A1* | 3/2013 | Foglar | H04L 41/5022 370/230.1 |
| 2013/0088997 A1 | 4/2013 | Briscoe et al. | |
| 2014/0068008 A1 | 3/2014 | Tzhori et al. | |
| 2014/0341015 A1 | 11/2014 | Johansson et al. | |
| 2015/0055639 A1* | 2/2015 | Park | H04B 7/2612 370/338 |
| 2016/0057065 A1 | 2/2016 | Briscoe | |
| 2016/0173394 A1* | 6/2016 | Harvell | H04L 47/25 709/203 |
| 2016/0173805 A1* | 6/2016 | Claus | H04N 17/004 348/148 |
| 2016/0182387 A1 | 6/2016 | Briscoe | |
| 2017/0280474 A1* | 9/2017 | Vesterinen | H04W 28/22 |

FOREIGN PATENT DOCUMENTS

| | | |
|---|---|---|
| EP | 0 853 441 | 7/1998 |
| EP | 1 179 925 | 2/2002 |
| EP | 1 399 849 | 3/2004 |
| EP | 1 496 652 | 1/2005 |
| EP | 1 734 707 A2 | 12/2006 |
| EP | 2 784 997 | 10/2014 |
| EP | 2 869 514 | 5/2015 |
| WO | WO 93/14605 | 7/1993 |
| WO | WO 02/103579 | 12/2002 |
| WO | WO 2009/118602 | 10/2009 |
| WO | WO 2015/078492 | 6/2015 |
| WO | WO 2017/021048 | 6/2016 |

OTHER PUBLICATIONS

Written Opinion of the IPEA for PCT/EP2016/063867, dated Jul. 3, 2017, 7 pages.
International Preliminary Report on Patentability for PCT/EP2016/063867, dated Aug. 14, 2017, 15 pages.
Search Report for EP15180017.4, dated Jan. 29, 2016, 9 pages.
Search and Examination Report for GB1513935.5, dated Mar. 15, 2016, 5 pages.
Akyildiz, Ian F. et al., "TCP-Peach: A New Congestion Control Scheme for Satellite IP Networks", IEEE/ACM Transactions on Networking (TON), vol. 9, Issue 3, Jun. 2001 (15 pgs.).
Andrikopoulos, I. et al., "Providing Rate Guarantees for Internet Application Traffic Across ATM Networks", Centre for Communication Systems Research (CCSR), University of Surrey, Communications Surveys, IEEE, vol. 2, Issue 3, 1999 (14 pgs.).
Bakhouya et al., "A Middleware for Large Scale Networks Inspired by the Immune System", Universit'e de Technologie de Belfort-Montbeliard, 90000 Belfort, France, Proceedings of the International Parallel and Distributed Processing Symposium (IPDPS.02) (5 pages), 2002.
Briscoe, B. et al., "More Accurate ECN Feedback in TCP", Transport Area Working Group, Internet-Draft, University of Stuttgart, Jul. 2, 2014 (55 pgs.).
Cisco Dwred "Distributed Weighted Random Early Detection" (18 pgs.) downloaded Dec. 30, 2015; http://www.cisco.com/univered/cc/td/doc/product/software/ios111/cc111/wred.htm.
Clark, David D. and Fan, Wenjia, "Explicit Allocation of Best-Effort Packet Delivery Service", IEEE/ACM Transactions on Networking, vol. 6, No. 4, Aug. 1998 (12 pgs.).
Congestion Avoidance Overview, Quality of Service Solutions Configuration Guide, QC-76, IOS Cisco—2013 (8 pgs.).
D. Cavendish et al., "CapStart: An Adaptive TCP Slow Start for High Speed Networks", 2009 First International Conference on Evolving Internet, Aug. 23-29, 2009 (6 pgs.).
English translation of Search Report dated Oct. 19, 2017, issued in corresponding Chinese Application No. 201480018721.3 (2 pages).
Floyd, S. et al., "Quick-Start for TCP and IP", Network Working Group, Nokia Research Center, Jan. 2007 (83 pgs.).
Ha, S. and Rhee, I., "Hybrid Slow Start for High-Bandwidth and Long-Distance Networks", Dept. of Computer Science, North Carolina State University, Proceedings of PFLDnet, 2008 (6 pgs.).
Hu, N. and Steenkiste, P., "Improving TCP Startup Performance using Active Measurements: Algorithm and Evaluation", Proceedings of the 11th IEEE International Conference on Network Protocols (ICNP'03), 2003 (12 pgs.).
International Search Report for PCT/GB2014/000121 dated May 22, 2014, 3 pages.
International Search Report for PCT/GB2014/000300, dated Jan. 5, 2015 (4 pages).

(56) References Cited

OTHER PUBLICATIONS

Jacobson et al., "Congestion Avoidance and Control", Nov. 1988, 25 pages.
Kuhlewind, M. and Briscoe, B., "Chirping for Congestion Control—Implementation Feasibility", Proceedings of PFLDNeT'10, 2010—ikr.uni-stuttgart.de (7 pgs.).
Kunniyur, Srisankar S., "AntiECN Marking: A Marking Scheme for High Bandwidth Delay Connections", Department of Electrical and Systems Engineering, University of Pennsylvania, 2003, ICC '03, IEEE International Conference on, 2003. (12 pgs.).
L.N. de Castro, "Artificial immune systems as a novel soft computing paradigm", Soft Computing 7, 2003, (20 pages) Springer-Verlag.
Leung, K. and Yeung, K. L., "TCP-Swift: An End-Host Enhancement Scheme for TCP over Satellite IP Networks", Department of Electrical and Electronic Engineering, The University of Hong Kong, Hong Kong, 2004 IEEE (5 pgs.).
Lin, D. and Morris, R., "Dynamics of Random Early Detection", Division of Engineering and Applied Sciences, Harvard University, Cambridge, MA, ACM SIGCOMM Computer Communication Review, 1997 (11 pgs.).
Liu, D. et al., "Congestion Control Without a Startup Phase", Case Western Reserve University, International Computer Science Institute, Proc. PFLDnet, 2007 (6 pgs.).
M. Alizadeh et al., "Less is More: Trading a little Bandwidth for Ultra-Low Latency in the Data Center", $9^{th}$ USENIX Symposium on Networked Systems Design and Implementation, Apr. 25-27, 2012 (14 pgs.).
Md Ehtesamul Haque and Md Humayun Kabir, "TCP Congestion control in Heterogeneous Network", Department of Computer Science and Engineering, Bangladesh University of Engineering and Technology, Bangladesh, Aug. 20, 2007 (6 pgs.).
Muschamp, "An Introduction to Web Services", BT Technology Journal, vol. 22 No. 1 Jan. 18, 2004 (10 pages).
N. Kaveh, et al., NEXUS—resilient intelligent middleware, BT Technology Journal, vol. 22, No. 3, Jul. 2004 (7 pages).
Padmanabhan, V. N. and Katz, R. H., "TCP Fast Start: A Technique for Speeding Up Web Transfers", Department of Electrical Engineering and Computer Sciences, University of California at Berkeley, Berkely, CA, In Proc. IEEE Globecom '98 Internet Mini-Conference, Sydney, Australia, Nov. 1998 (5 pgs.).
Ramakrishnan, K. et al., "The Addition of Explicit Congestion Notification (ECN) to IP", Memo, Network Working Group, Sep. 2001 (63 pgs.).
Sathiaseelan, A. et al., "Enhancing TCP to Support Rate-Limited Traffic", CSWS'12, Proceedings of the 2012 ACM workshop on Capacity sharing, 2012 (6 pgs.).
Satoh, D. et al., "Single PCN Threshold Marking by using PCN baseline encoding for both admission and termination controls", PCN Working Group, Internet-Draft, Mar. 9, 2009 (36 pgs.).
Scharf, M. et al., "Speeding up the 3D Web: A Case for Fast Startup Congestion Control", Proceedings of PFLDNeT, 2009 (6 pgs.).
Schmidt et al., "Flexible Information Discovery in Decentralized Distributed Systems", *The Applied Software Systems Laboratory, Department of Electrical and Computer Engineering, Rutgers University*, Proceedings of the 12th IEEE International Symposium on High Performance Distributed Computing (HPDC'03) (10 pages).
Singh, M. et al., "Utilizing spare network bandwidth to improve TCP performance", Cornell University, Poster in Proc. of ACM SIGCOMM, 2005 (1 pg.).
Timmis, et al., "An Overview of Artificial Immune Systems", Computation in Cells and Tissues: Perspectives and Tools for Thought, Natural Computation Series, Springer (37 pages).
Venkataraman, V. et al., "A priority-layered approach to transport for high bandwidth-delay product networks", CoNEXT '08 Proceedings of the 2008 ACM CoNEXT Conference, Article No. 14, 2008 (6 pgs.).
WAN optimization From Wikipedia, the free encyclopedia, http://en.wikipedia.org/w/index.php?title=WAN_optimization&printable=yes, retrieved from the internet Feb. 5, 2013 (3 pgs).
WAN optimization techniques, http://searchenterprisewan.techtarget.com/feature/WAN-optimization-techniques, retrieved from the internet on Feb. 5, 2013 (4 pgs.).
Xia, Y. et al., "One More Bit Is Enough", SIGCOMM'05, Aug. 22-26, 2005, Philadelphia, Pennsylvania, USA (12 pgs.).
International Search Report for PCT/EP2016/063871, dated Aug. 31, 2016, 11 pages.
Written Opinion of the ISA for PCT/EP2016/063871, dated Aug. 31, 2016, 6 pages.
International Preliminary Report on Patentability for PCT/EP2016/063871, dated Aug. 14, 2017, 13 pages.
Combined Search and Examination Report for GB 1513926.4, dated Mar. 15, 2016, 5 pages.
Written Opinion of the ISA for PCT/EP2016/063871, dated Jul. 3, 2017, 7 pages.

* cited by examiner

DATA PACKET NETWORK

This application is the U.S. national phase of International Application No. PCT/EP2016/063867 filed 16 Jun. 2016, which designated the U.S. and claims priority to EP Patent Application No. 15180017.4 filed 6 Aug. 2015, the entire contents of each of which are hereby incorporated by reference.

FIELD OF THE INVENTION

The present invention relates to a data packet network and to a method of controlling packets in a data packet network.

BACKGROUND

A majority of networks in use today use discrete data packets which are transferred between a sender and receiver node via one or more intermediate nodes. A common problem in these data packet networks is that the sender node has little or no information on the available capacity in the data packet network, and thus cannot immediately determine the appropriate transmission rate at which it may send data packets. The appropriate transmission rate would be the maximum rate at which data packets can be sent without causing congestion in the network, which would otherwise cause some of the data packets to be dropped and can also cause data packets on other data flows (e.g. between other pairs of nodes which share one or more intermediate nodes along their respective transmission paths) to be dropped.

To address this problem, nodes in data packet networks use either a closed or open-loop congestion control algorithm. Closed loop algorithms rely on some congestion feedback being supplied to the sender node, allowing it to determine or estimate the appropriate rate at which to send future data packets. However, this congestion feedback can become useless in a very short amount of time, as other pairs of nodes in the network (sharing one or more intermediate nodes along their transmission paths) may start or stop data flows at any time. Accordingly, the congestion feedback can quickly become outdated and the closed loop algorithms do not accurately predict the appropriate rate to send data packets. This shortcoming becomes ever more serious as capacities of links in data packet networks increase, meaning that large increases or decreases in capacity and congestion can occur.

Open-loop congestion control algorithms are commonly used at the start of a new data flow when there is little or no congestion information from the network. One of the most common congestion control algorithms is the Transmission Control Protocol, TCP, 'Slow-Start' algorithm for Internet Protocol, IP, networks, which has an initial exponential growth phase followed by a congestion avoidance phase. When a new TCP Slow-Start flow begins, the sender's congestion window (a value representing an estimate of the congestion on the network) is set to an initial value and a first set of packets is sent to the receiver node. The receiver node sends back an acknowledgement to the sender node for each data packet it receives. During the initial exponential growth phase, the sender node increases its congestion window by one packet for every acknowledgment packet received. The congestion window, and thus the transmission rate, is therefore doubled every round trip time. Once the congestion window reaches the sender node's Slow-Start Threshold ('ssthresh'), then the exponential growth phase ends and it starts the congestion avoidance phase in which the congestion window is only increased by one packet for every round-trip it receives an acknowledgement, regardless of how many acknowledgment packets are received. If at any point an acknowledgement packet (or its absence) indicates that a loss has occurred, which is likely due to congestion on the network, then the sender node responds by halving the congestion window in an attempt to reduce the amount of congestion caused by that particular data flow. However, the sender node receives this feedback (i.e. the acknowledgment packet indicating that a loss had occurred) one round trip time after its transmission rate exceeded the available capacity. By the time it receives this feedback it will already be sending data twice as fast as the available capacity. This is known as 'overshoot'.

The exponential growth phase can cause issues with non-TCP traffic. Consider the case of a low-rate (e.g. 64 kB/s) constant bit-rate voice flow in progress over an otherwise empty 1 GB/s link. Further imagine a large TCP flow starts on the same link with an initial congestion window of ten 1500 B packets and a round trip time of 200 ms. The flow keeps doubling its congestion window every round trip until, after nearly eleven round trips, its window is 16,666 packets per round (1 Gb/s). In the next round it will double to 2 Gb/s before it gets the first feedback detecting drops that imply it exceeded the available capacity in the network a round trip earlier. About 50% of the packets in this next round (16,666 packets) will be dropped.

In this example, the TCP Slow-Start algorithm has taken eleven round-trip times (over two seconds) to find its correct operating rate. Furthermore, when TCP drops such a large number of packets, it can take a long time to recover, sometimes leading to a black-out of many more seconds. The voice flow is also likely to black-out for at least 200 ms and often much longer, due to at least 50% of the voice packets being dropped over this period.

There are thus two main issues with the overshoot problem. Firstly, it takes a long time for data flows to stabilise at an appropriate rate for the available network capacity and, secondly, a very large amount of damage occurs to any data flow having a transmission path sharing the now congested part of the network.

Further concepts of data packet networks will now be described.

A node typically has a receiver for receiving data packets, a transmitter for transmitting data packets, and a buffer for storing data packets. When the node receives a data packet at the receiver, it is temporarily stored in the buffer. If there are no other packets currently stored in the buffer (i.e. the new packet is not in a 'queue') then the packet is immediately forwarded to the transmitter. If there are other packets in the buffer such that the new packet is in a queue, then it must wait its turn before being forwarded to the transmitter. A few concepts regarding the management and exploitation of node buffers will now be described.

A node implementing a very basic management technique for its buffer would simply store any arriving packet in its buffer until it reaches capacity. At this point, any data packet which is larger than the remaining capacity of the buffer will be discarded. This is known as drop-tail. However, this results in larger packets being dropped more often that smaller packets, which may be still be added to the end of the buffer queue. An improvement on this technique was a process known as Active Queue Management (AQM), in which data packets are dropped when it is detected that the queue of packets in the buffer is starting to grow above a threshold rate, but before the buffer is full. This gives the buffer sufficient capacity to absorb bursts of packets, even during long-running data flows.

Some nodes may treat each data packet in its buffer the same, such that data packets are transmitted in the same sequence in which they were received (known as "First In First Out"). However, node buffer management techniques introduced the concept of marking data packets with different classes of service. This technique can be used by defining certain classes as higher than others, and a network node can then implement a forwarding function that prevents or mitigates the loss or delay of packets in a higher class at the expense of a packet in a lower class. Examples of techniques that manage packet buffers using differing classes of service include:

- (Non-strict) Prioritisation: In this technique, higher class packets will be forwarded by a network node before a lower class packet, even if the lower class packet arrived at the node earlier. This is often implemented by assigning a lower weight to a lower class, and serving each class in proportion to its weight.
- Strict Prioritisation: Similar to the non-strict prioritisation, although a lower class packet will never be forwarded whilst a higher class packet is present in the buffer.
- Traffic Policer: A network node may enforce a traffic profile specifying, for example, limits on the average rate and the maximum size of bursts. Any data flow that does not meet the profile is marked accordingly and may be discarded if congestion reaches a certain level.
- Preferential Discard: If a buffer is filled with a queue of data packets, then any lower class packets will be preferentially discarded before higher class packets.
- Selective Packet Discard: A proportion of the buffer is reserved for higher class data packets. The lower class packets may only occupy a smaller proportion of the buffer (relative to the buffer of that node without selective packet discard), and packets will be discarded if that smaller buffer is full.
- AQM: AQM, as mentioned above, drops packets when it is detected that the queue of packets in the buffer is starting to grow above a threshold rate. This can be modified such that the packets dropped by AQM are those of a lower class of service.

The approaches of Strict Prioritisation and Preferential Discard were both proposed to ensure lower class packets cannot cause harm to higher class packets. However, there are still problems with these techniques. In Strict Prioritisation, some network nodes may have one or more higher priority packets in the buffer for long periods (many seconds or even minutes), particularly during peak hours. This causes any lower class data packets to remain in the buffer for a long period of time. During this period, the sending/receiving nodes would probably time out and the data packet would be retransmitted in a higher class (on the assumption that the lower class packet was discarded). When the busy period in the higher priority buffer ends, the buffer of lower class data packets is finally transmitted. This merely wastes capacity as the data has already been received from the retransmitted higher-priority packet.

Network nodes can exploit the lower class data packets to determine the available capacity in the network (known as 'probing'). In Preferential Discard, a burst of 'discard eligible' probing data packets may fill up a buffer, and only then is Preferential Discard triggered. During probing the discard eligible packets will cause a queue up to the discard threshold even if newly arriving probing traffic is discarded. Thus, probing will not be non-intrusive because higher class traffic from established flows will experience increased delay.

It is therefore desirable to alleviate some or all of the above problems.

SUMMARY OF THE INVENTION

According to a first aspect of the invention, there is provided a method of controlling packets in a data packet network, the method comprising the steps of: a source node sending a first set of packets to a receiver node over the data packet network via an intermediate node, wherein the first set of packets are of a class of service such that the intermediate node should not forward the first set of packets to the receiver node if a packet queue exists at the intermediate node; the source node receiving a first acknowledgement of a first received packet of the first set of packets from the receiver node; and the source node sending a second set of packets to the receiver node over the data packet network.

According to a second aspect of the invention, there is provided a method of controlling a network node in a data packet network, the network node including a buffer, the method comprising the steps of: receiving a first data packet from a first external network node; analysing the first data packet to determine if it is of a class of service deemed to be queueable or unqueueable; and, if it is unqueueable, determining if at least one data packet is stored in the network node's buffer; and, if so, the first data packet is not transmitted.

The present invention provides a new class of service for data packets in which the data packet may not be queued if there are already data packets present in a buffer of an intermediate node between a sending and receiving node. If another data packet is present in the buffer, then the unqueueable packet may be discarded by the intermediate node. These packets may be sent at the beginning of a data transfer between a sending and receiving node (e.g. at an early stage of the exponential growth phase of the TCP Slow-Start algorithm), and these unqueueable packets may then be dropped at the intermediate node which represents a bottleneck in the transmission path between the sending and receiving nodes. Accordingly, any acknowledgment packet sent back from the receiving node to the sending node in response to the unqueueable packets has the effect of limiting the transmission rate of future packets to the bottleneck rate of the network. The present invention therefore provides a method of establishing the appropriate transmission rate much earlier in the data transfer than TCP Slow-Start and, in doing so, drops fewer data packets.

The method may further comprise the step of the source node sending an initial set of packets to the receiver node over the data packet network via the intermediate node, wherein the initial set of packets are of a class of service allowing them to be queued at the intermediate node. The rate the source node sends the first set of packets may be higher than the rate the source node sends the initial set of packets. In this manner, the rate at which the acknowledgment packets are received by the source node is closer to the bottleneck rate.

The first set of packets may contain dummy data. These first set of packets may therefore be probing packets which do not contain requested data, and thus do not have to be retransmitted if dropped. Alternatively, the first set of packets may contain requested data, and the acknowledgement may indicate that a packet of the first set of packets was prevented from being forwarded to the receiver node; and the second set of packets may include a retransmission of said prevented packet.

The source node may be a node containing the requested data (and thus the original source of a transmission) or an intermediate node between the original source and the receiving node. Any two nodes in a data packet network may use the method of the present invention in order to establish the bottleneck rate of a transmission path, and may do so at any time. In one embodiment, as detailed below, the method of the present invention is performed at the start of a new data flow. Alternatively, the method of the present invention may be performed before a new data starts, and the calculated bottleneck rate may then be used to configure the transmission rate of the new data flow. Thus, the method may further comprise the steps of: the source node receiving a second acknowledgement of a second received packet of the first set of packets from the receiver node; the source node determining a transmission rate between the source node and receiver node based on the rate the first and second acknowledgements are received at the source node; the source node transmitting a second set of data packets to the receiver node based on the determined transmission rate.

A network node and a computer program configured to carry out the methods of the first and second aspects of the invention are also provided. A network comprising said network node is also provided.

According to a third aspect of the invention, there is provided a data packet for transmission in a data packet network, wherein the data packet is identifiable by a node in the data packet network as being of a class of service such that it should not be forwarded if a packet queue exists at said node. The data packet may further comprise an identifier indicating that the data packet is unqueuable.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
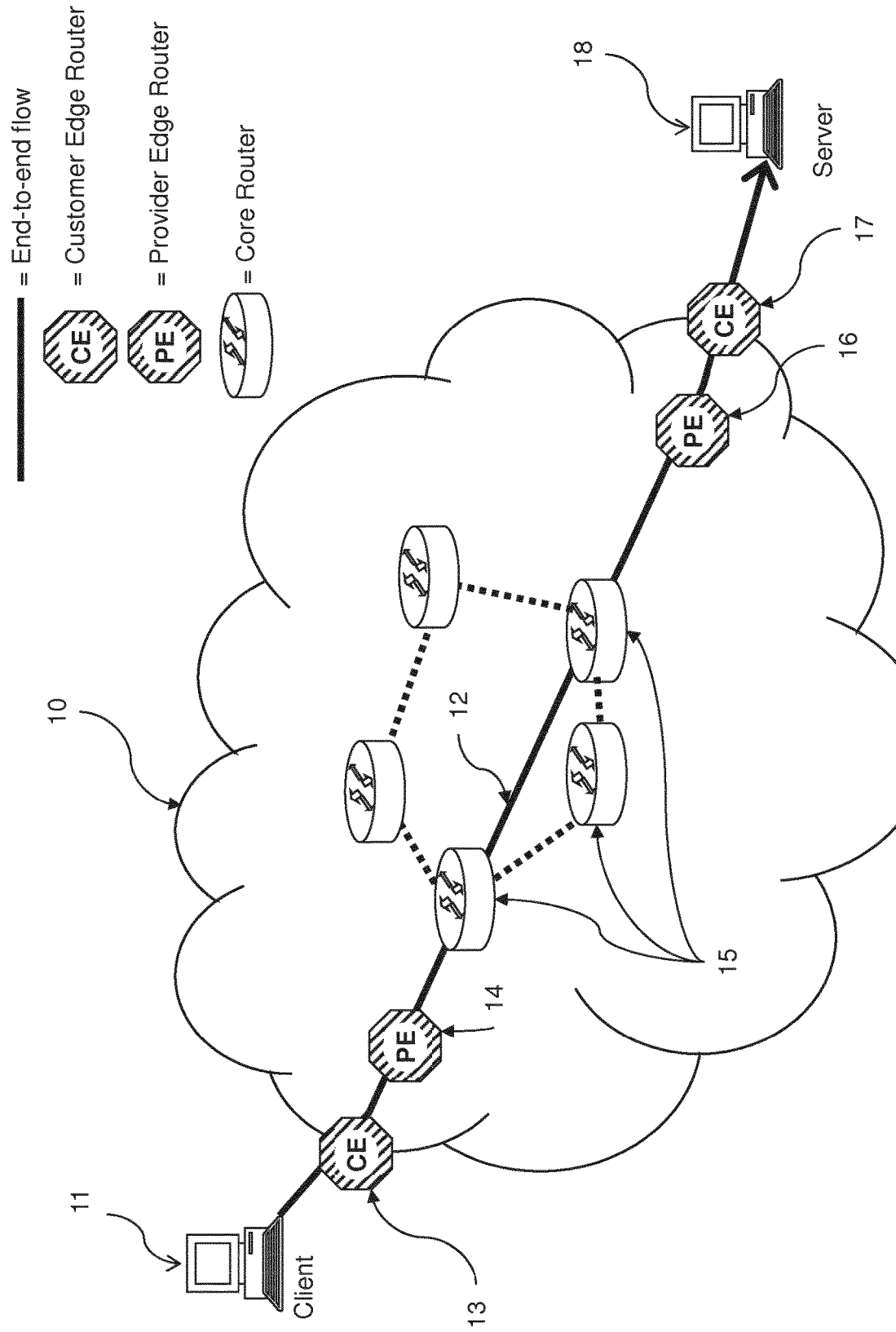
FIG. 1 is a schematic diagram of a communications network of an embodiment of the present invention.

A first embodiment of a communications network 10 of the present invention will now be described with reference to FIGS. 1 to 2b. The communications network 10 is a data packet network having a client 11, a server 18, a plurality of customer edge routers 13, 17, a plurality of provider edge routers 13, 16, and a plurality of core routers 15. The client 11 sends data packets to the server 18 via path 12, which traverses a plurality of customer edge, provider edge and core routers. The skilled person will understand that other clients and servers may be connected to the customer edge routers, and other customer edge routers may be connected to the provider edge routers.

When the client 11 sends a data packet along path 12, it is initially forwarded to a first customer edge router 13, which forwards it on to the first provider edge router 14. The first provider edge router 14 forwards the data packet to a core router 15, which in turn forwards it on to a second provider edge router 16 (which may be via one or more other core routers). The second provider edge router 16 forwards the data packet to a second customer edge router 17, which forwards it on to the server 18.

Figure 2A:
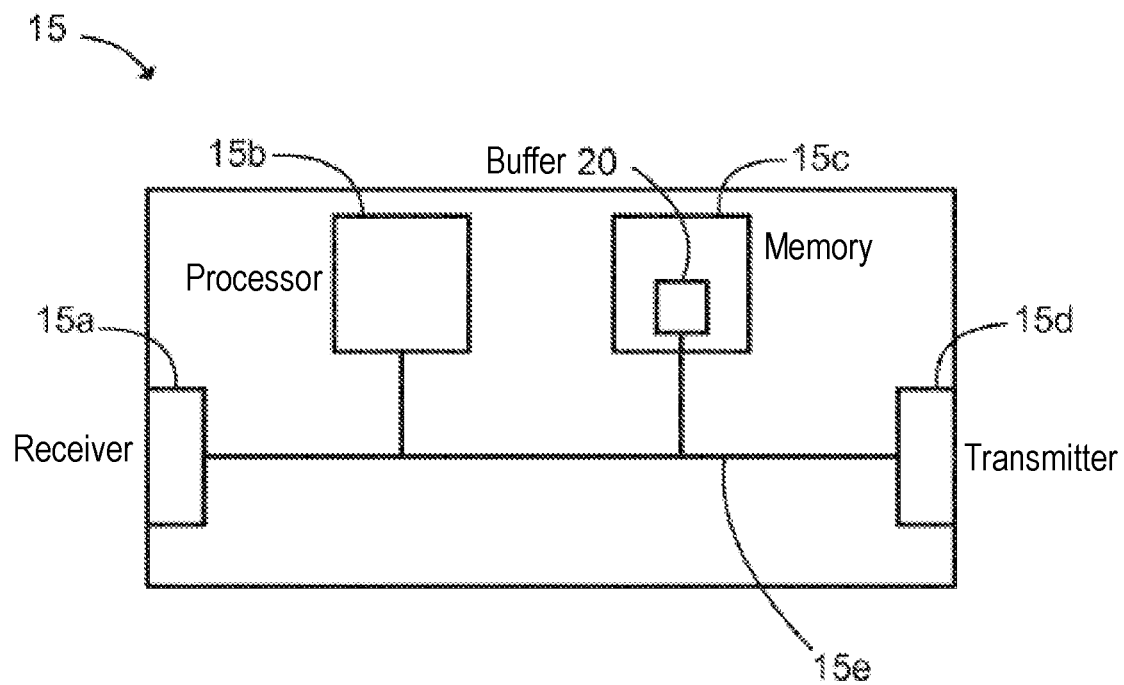
FIG. 2a is a schematic diagram illustrating a router of the network of FIG. 1.

A core router 15 is shown in more detail in FIG. 2a (and the skilled person will understand that any other router from FIG. 1 includes a similar construction). The core router 15 includes a receiver 15a adapted to receive data packets, a processor 15b, a first memory 15c including a buffer 20 for storing data packets awaiting transmission, and a transmitter 15d for sending a data packet. All modules of the router 15 are connected via a bus 15e.

Figure 2B:
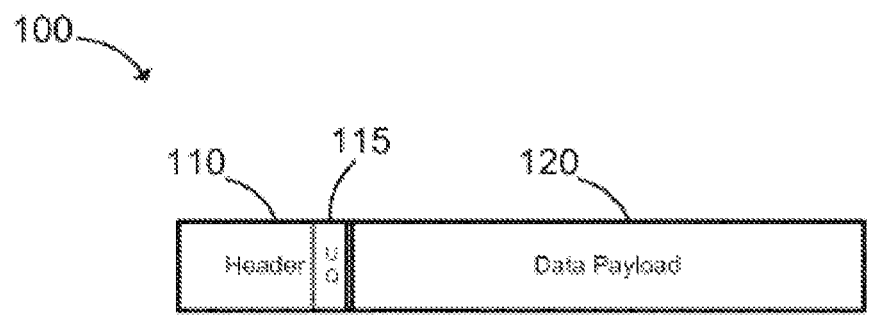
FIG. 2b illustrates a data packet of an embodiment of the present invention.

FIG. 2b illustrates a data packet 100 of the present invention. The data packet 100 includes a header portion 110 and a data payload portion 120. The header portion 110 is modified to include an identifier 115 that the data packet 100 is of an unqueuable class of service. The processor 15b of the router 15 (and, for completeness, any other node in the communications network 10) is adapted to decode the header portion 110 of the data packet and determine that it is unqueuable (in contrast to other classes of service, such as Best-Efforts (BE), which may be queued). A router 15 of the communications network 10 may therefore only store this UQ packet if there are no other data packets currently being stored in the buffer 20.

The skilled person will understand that the identifier may be stored in the 6-bit Differentiated Services field (DSfield) of an IPv4 or IPv6 packet, the 3-bit 802.1p Class of Service (CoS) field of an Ethernet frame or the 3-bit Traffic Class field of an MPLS frame. The skilled person will also understand that other identifiers or codepoints could be used, so long as the relevant nodes in the network understand that this identifier/codepoint indicates that the data packet is unqueuable. This will now be explained with reference to two scenarios illustrated in FIGS. 3 and 4.

Figure 3:
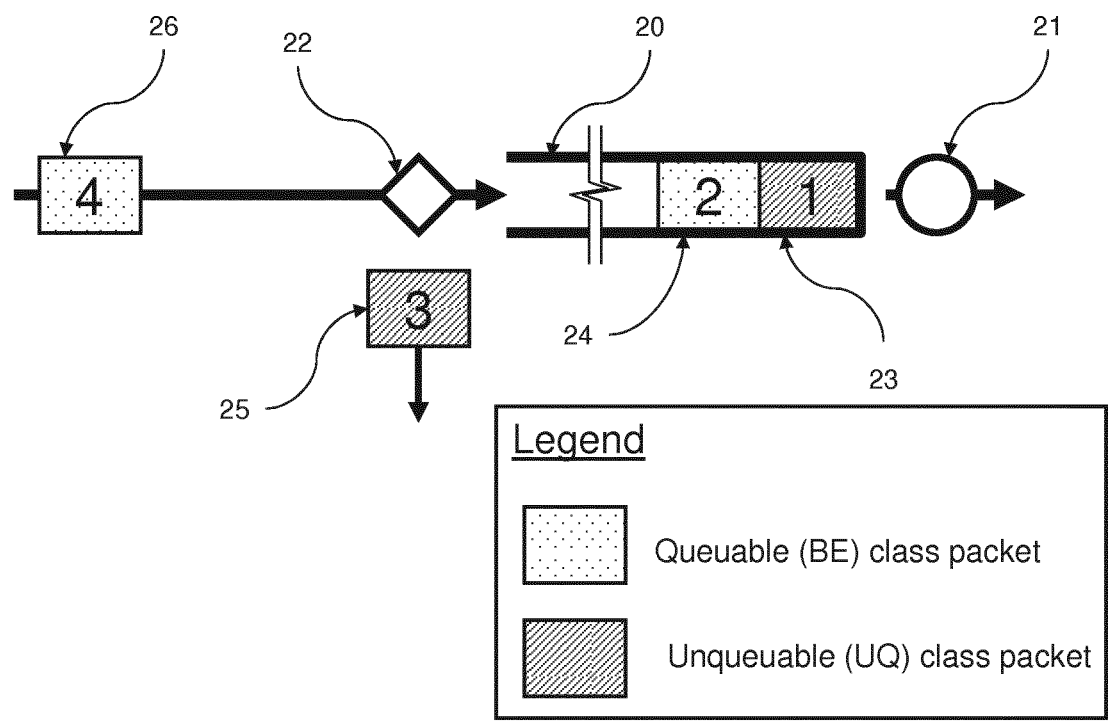
FIG. 3 is a schematic diagram illustrating the data packet of FIG. 2b being processed by a router of the communications network of FIG. 1 in a first scenario.

A schematic diagram illustrating an overview of the processing of data packets by core router 15 in accordance with the present invention is shown in FIG. 3. Data packets arrive at the core router 15 via the receiver 15a. In the diagram, data packets are either of a queuable class (e.g. a conventional Best-Efforts (BE) data packet), or an unqueuable (UQ) class according to the present invention. In the scenario depicted in FIG. 3, a first packet 23 arrives at the receiver 15d, and a management function 22 (of processor 15b, which generally classifies, schedules and enqueues arriving data packets) determines that it is of the unqueuable class, but also determines that there are no data packets present in the buffer 20. The management function 22 therefore stores the first packet 23 in the buffer 20 whilst the dequeuing function 21 (also implemented by processor 15*b*) forwards it to the transmitter 15*d*.

Whilst the first packet 23 is being forwarded to the transmitter 15*d*, a second packet 24 arrives at the receiver 15*a*. The management function 22 determines that the second packet 24 is a queueable BE packet. In this scenario, the first packet 23 has not yet been fully transmitted and is thus still present in the buffer 20. The second packet 24 is thus stored in the buffer 20 behind the first packet 23. A third packet 25 then arrives at the receiver 15*a* whilst the first and second packets 23, 24 are still present in the buffer 20. The management function 22 determines that the third packet 25 is a UQ packet and that there are already data packets in the buffer 20. In this case, the management function 20 discards the data packet (i.e. it is prevented from being transmitted to the server 18). Lastly, a fourth packet 26 arrives, and is again determined to be a queueable BE packet and is therefore stored in the buffer 20.

Figure 4:
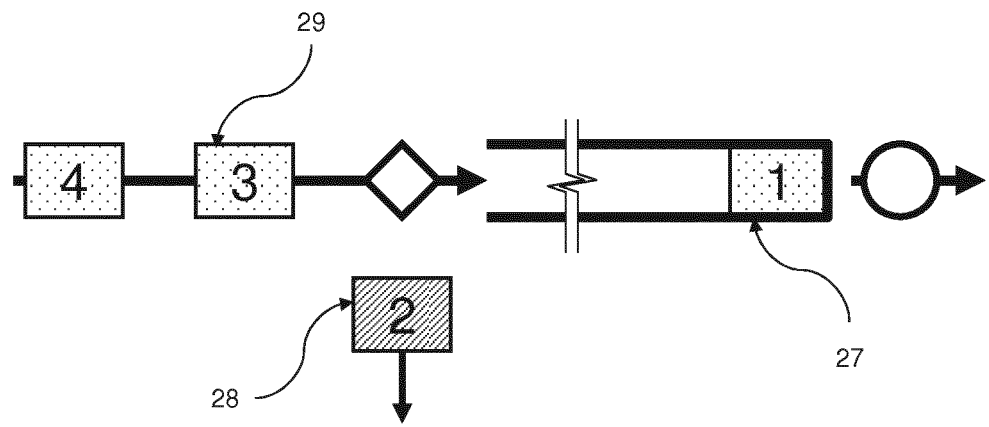
FIG. 4 is a schematic diagram illustrating the data packet of FIG. 2b being processed by a router of the communications network of FIG. 1 in a second scenario.

A second scenario is illustrated in FIG. 4, in which the first packet 27 to arrive at the receiver 15*a* whilst the buffer 20 is empty is a queueable BE packet. The management function 22 stores this packet in the buffer 20 whilst it is being forwarded to the transmitter 15*d* by the dequeuing function 21. Whilst the first packet 27 is being forwarded, a second packet 28 of the UQ class arrives. The management function 22 determines that it is of the UQ class and that the buffer is non-empty. The second packet 28 is therefore discarded. As further queueable BE packets (e.g. packet 29) arrive, the management function may store them in the buffer 20 even if the first packet 27 is still being forwarded.

In the above two scenarios, the packets are deemed to have left the buffer at the time the transmitter completes its transmission of the last byte of the packet. Once this last byte has completed its transmission, then the buffer may store an unqueuable packet.

Figure 5A:
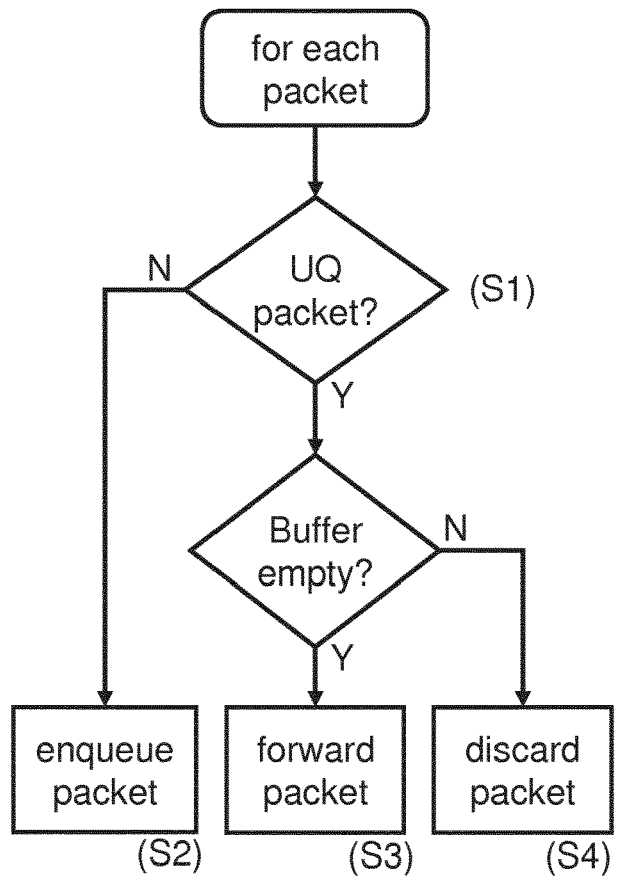
FIG. 5a is a flow diagram illustrating a method of processing the data packet of FIG. 2b.

A flow diagram representing a first embodiment of the management function 22 of the processor 15*b* is shown in FIG. 5*a*. In step S1 of this diagram, a new data packet is examined to determine whether it is of the UQ class. This may be achieved by the processor 15*b* decoding the header portion 110 of the data packet and determining whether the identifier/codepoint matches a known identifier/codepoint for the UQ class. If the processor 15*b* determines that the new data packet is of a queueable class, the processor 15*b* passes the new data packet to the enqueuing function and it is stored in buffer 20 (step S2). However, if the processor 15*b* determines that the new data packet is unqueuable, then the processor 15*b* determines whether the buffer 20 is empty or not. If it is empty, then the processor 15*b* again passes the new data packet to the enqueuing function and it is stored in buffer 20 (step S3). Alternatively, if the processor 15*b* determines that that buffer is not empty, then the processor 15*b* discards the packet (step S4).

Figure 5B:
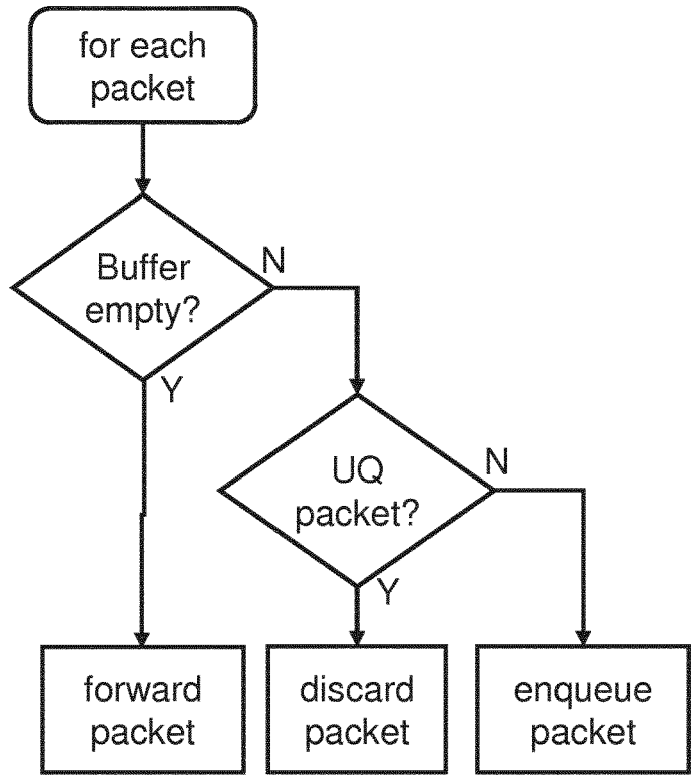
FIG. 5b is a flow diagram illustrating an alternative method of processing the data packet of FIG. 2b.

A flow diagram illustrating a second embodiment of the management function 22 of the processor 15*b* is shown in FIG. 5*b*. In this embodiment, the steps of determining whether the buffer is empty and determining whether the packet is unqueuable are reversed.

The unqueuable class of service can be exploited by a sender/receiver node 11, 18 pair in order to determine an appropriate transfer rate to use in the communications network 10 (i.e. the maximum rate at which data can be transmitted without causing any packets to be dropped or causing packets on data flow sharing part of the same transmission path to be dropped). Before an embodiment of this algorithm is described, an overview of the conventional TCP Slow-Start process and its corresponding timing diagram will be presented with reference to FIG. 6.

Figure 6:
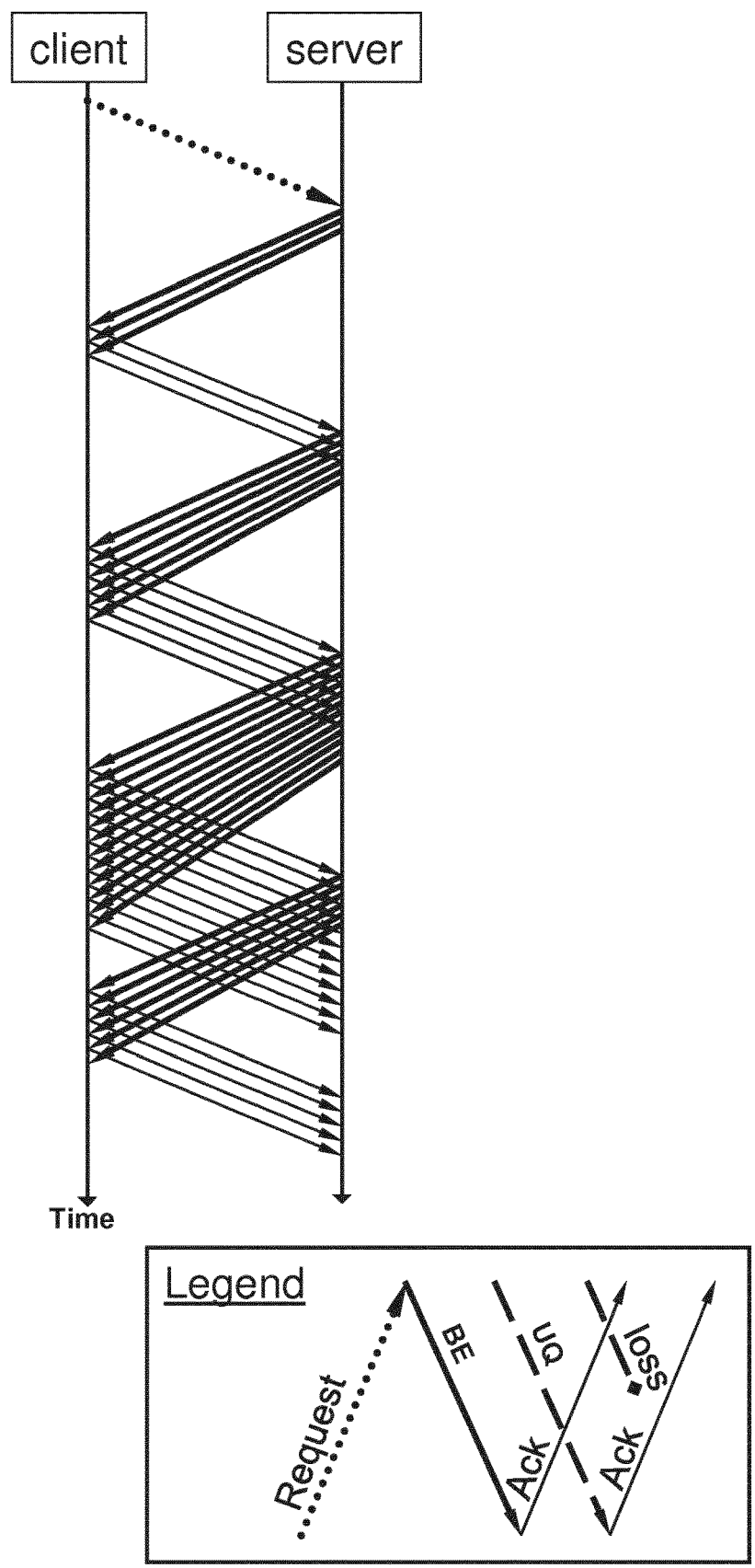
FIG. 6 is a timing diagram representing the TCP Slow-Start algorithm of the prior art.

FIG. 6 is a timing diagram in which two time axes extend downwardly from a client (e.g. client 11) and a server (e.g. server 18). Various data packets are represented by arrows extending between the two time axes, which illustrate a data packet being sent or received by the client or server (such that the root of an arrow represents the time the client/server sends a packet, and the head of the arrow represents the time the client/server receives the packet). The data packets will typically traverse several customer edge routers, provider edge routers and core routers (as illustrated in FIG. 1), but only the two end-systems are illustrated for simplicity. In the TCP Slow-Start process, the client sends an initial request to the server for data. The server responds by buffering a stream of data packets to send to the client and sets its initial congestion window to the current standard TCP size of three packets. Accordingly, the server sends three packets of data (represented by thick unbroken arrows) from the buffer towards the client, which are all marked as BE class of service.

In this example, these three packets do not experience any congestion and are all received by the client in a timely manner. The client therefore sends an acknowledgment packet (represented by thin unbroken arrows) for each of the three packets of data to the server. The server receives these acknowledgements and, in response, increases the congestion window (by one packet for each acknowledgement received). The server therefore sends six data packets in the next transmission. In FIG. 6, there are four round trips of data packets being sent and acknowledgments received before the server has completed the transfer of all the data packets from its buffer. The algorithm therefore remains in the exponential growth phase until it completes the transfer.

The skilled person would understand that if the data stream were much larger, then the TCP Slow-Start algorithm would increase its congestion window by one packet for each acknowledgement received until it reaches its slow start threshold. Once this threshold is reached, then the congestion window is increased by one packet if it receives an acknowledgment within one round-trip time (i.e. before a time-out occurs), regardless of how many acknowledgments are received in that time. The algorithm therefore moves from an exponential growth phase to a linear congestion avoidance phase. The skilled person would also understand that if a time-out occurs without receiving any acknowledgements, or an acknowledgement is received indicating that packets have been dropped, then the congestion window is halved.

Figure 7:
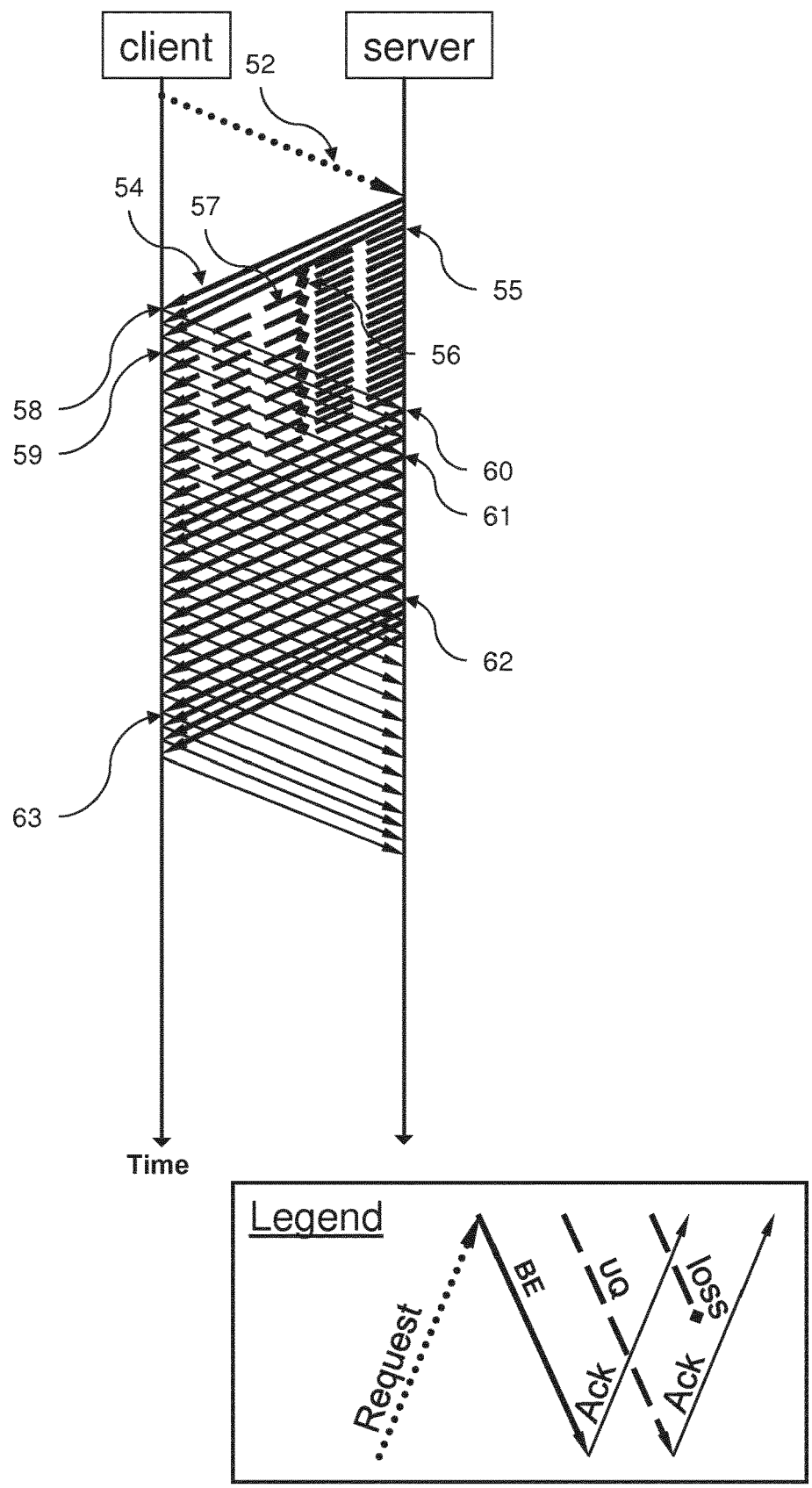
FIG. 7 is a timing diagram illustrating an embodiment of a method of the present invention.

An embodiment of a method of the present invention will now be described with reference to FIG. 7. FIG. 7 is also a timing diagram in which two time axes extend downwardly from the client 11 and the server 18, in which various data packets are represented by arrows extending between the two time axes illustrating a data packet being sent or received by the client 11 or server 18 (such that the root of an arrow represents the time the sender/receiver node sends a packet, and the head of the arrow represents the time the sender/receiver node receives the packet). Again, the data packets traverse several customer edge routers 13, 17, provider edge routers 14, 16 and core routers 15 (as illustrated in FIG. 1), but only the two end-systems are shown for simplicity.

The initial steps of the method of the present invention are very similar to the Slow-Start method outlined above. The client 11 sends an initial request 52 to the server 18 for data. The server 18 responds by buffering a stream of data packets to send to the client 11 and sets its initial congestion window to the current standard TCP size of three packets. Accordingly, the server 18 sends three packets of data 54 from the buffer towards the client 11, which are all marked as BE class of service (represented by thick, unbroken arrows).

At this point, the method of the present invention differs from the conventional Slow-Start algorithm. Following the initial three BE packets of data, the server 18 continues to send further data packets 55 from the buffer towards the client 11. Each of these further data packets are marked as UQ (e.g. the header portions contain an identifier/codepoint which all nodes in the communications network 10 recognise as being of the unqueuable class), and, in this embodiment, are sent at a higher transmission rate than the first three BE packets. These UQ data packets are represented by dashed arrows in FIG. 7.

The initial BE data packets and the following burst of UQ data packets leave the server 18 at the maximum rate of its transmitter. In this example, this is over a 1 GB/s connection between the network interface on the server 18 and the second customer edge router 17 (e.g. a 1 Gb/s Ethernet link). Once these BE and UQ packets arrive at the second customer edge router 17, they are forwarded to the second provider edge router 16. In this example, this is over a 500 Mb/s access link. Thus, when the first UQ packet arrives at the second customer edge router 17, the second customer edge router's 17 relatively slower output rate (i.e. the slower transmission rate of forwarding packets to the second provider edge router 16 relative to the transmission rate of receiving packets from the server 18) represents a bottleneck in the communications network 10. The second customer edge router's 17 buffer 20 will therefore have to queue the received data packets according to the management function 22 described earlier.

Accordingly, the first three BE packets arrive at the second customer edge router 17. The header portions of all these BE packets are decoded and the management function 22 determines that they are all queueable BE packets. In this example, there are initially no other data packets in buffer 20. Accordingly, all three BE packets are stored in the buffer 20 and the first of these BE packets is forwarded to the transmitter.

As noted above, a stream of UQ packets are sent from the server 18 to the second customer edge router 17 after these initial three BE packets. The first of these UQ packets arrive at the second customer edge router 17 and the header portion is decoded. The management function 22 determines that it is an UQ packet. It also determines that the buffer 20 is not empty (as the three BE packets have not all been transmitted when the first UQ packet arrives) and thus discards the first UQ packet. The discarded UQ packet is represented by a line having a diamond head (rather than an arrow head) terminating in the area between the server 18 and client 11 in FIG. 7.

The second of the UQ packets arrives at the second customer edge router 17 and the header portion is decoded. The management function 22 again determines that it is an UQ packet and again also determines that the buffer 20 is not empty. The second UQ packet is therefore discarded.

Eventually, all three BE packets are successfully transmitted to the second provider edge router 16 and the buffer 20 of the second customer edge router 17 is empty. The third UQ packet then arrives at the second customer edge router 17 and the header portion is decoded. Again, the management function 22 determines that it is an UQ packet but now determines that the buffer 20 is empty. The third UQ packet is therefore stored in the buffer 20 and forwarded to the transmitter 57 for onward transmission to the provider edge router 16 (and ultimately the client 11). This is illustrated in FIG. 7 as the third dashed line extending from the server's 18 time axis (representing the third UQ packet) to the client 11.

Whilst the third UQ packet is being transmitted, a fourth UQ packet arrives and the header portion is decoded. The management function 22 determines that it is an UQ packet and that the buffer is not empty (as the third UQ packet is stored in the buffer 20 whilst it is being transmitted). The fourth UQ packet is therefore discarded.

Meanwhile, as shown in FIG. 7, the initial three BE packets arrive at the client 11. In response, the client 11 sends three BE acknowledgment messages 58 back to the server 18 indicating that the BE packets were successfully received. Note that, for the purposes of this description, the terms BE acknowledgment messages and UQ acknowledgment messages are used to differentiate between acknowledgement messages sent in response to a BE or UQ message respectively, but do not necessarily imply any difference between the messages themselves.

Whilst these BE acknowledgment messages traverse the communications network 10 to the server 18, the server 18 continues sending UQ packets to the client 11. As noted above and as shown in FIG. 7, some of these UQ packets successfully traverse the communications network 10 and arrive at the client 11, whilst some are dropped by an intermediate node (e.g. the second customer edge router 17, which drops an UQ packet as the previous UQ packet is present in the buffer 20 whilst it is being transmitted).

Whenever an UQ packet successfully arrives at the client 11, the client 11 sends out an UQ acknowledgment message 59.

As shown in FIG. 7, the rate at which the client 11 sends out the BE acknowledgment messages (i.e. in response to the initial BE packets) is greater than the rate at which the client 11 sends out UQ acknowledgement message in response to the UQ packets. This is due to some UQ packets being dropped whenever it experiences a queue at an intermediate node between the server 18 and the client 11 coupled with the small time delay between each UQ packet being sent by the server. This has important consequences on how the server 18 determines the appropriate transmission rate for the communications network 10, as will now be described.

When the first BE acknowledgment message arrives at the server 18, the server 18 stops sending UQ data packets to the client 11. The server 18 is configured, on receipt of this BE acknowledgment message, to end its start-up phase and enter a congestion-avoidance phase. Like the conventional TCP Slow-Start algorithm, the algorithm of this embodiment of the present invention is 'self-clocking', such that a new data packet is transmitted from the server 18 towards the client 11 in response to each acknowledgement it receives. In this embodiment, following receipt of the first BE acknowledgment packet from the client 11, the server 18 starts sending a second batch of BE packets 60 to the client 11. The first three BE packets of this second batch is sent at a transmission rate corresponding to the rate at which it receives the first three BE acknowledgment messages. However, it will be seen from FIG. 7 that the server 18 then starts receiving the UQ acknowledgment messages (sent by the client 11 in response to the successfully received UQ packets) 61. Each of these UQ acknowledgment messages has the effect of modifying the transmission rate of the next BE packets in the second batch of BE packets. In this example, as noted above, the rate of UQ acknowledgment packets is lower than that of the initial BE acknowledgment messages, and the self-clocking nature of the algorithm therefore reduces the transmission rate of the next BE packets to the bottleneck rate This new rate is slightly less than the bottleneck rate due to UQ packets being dropped by an intermediate node whenever there is a queue present and due to the small time delay between successive UQ packets being sent by the server. However, this difference between the two rates can be reduced to negligible amounts if this time delay is minimised (for example, by using small UQ packets which require minimal processing).

Figure 8:
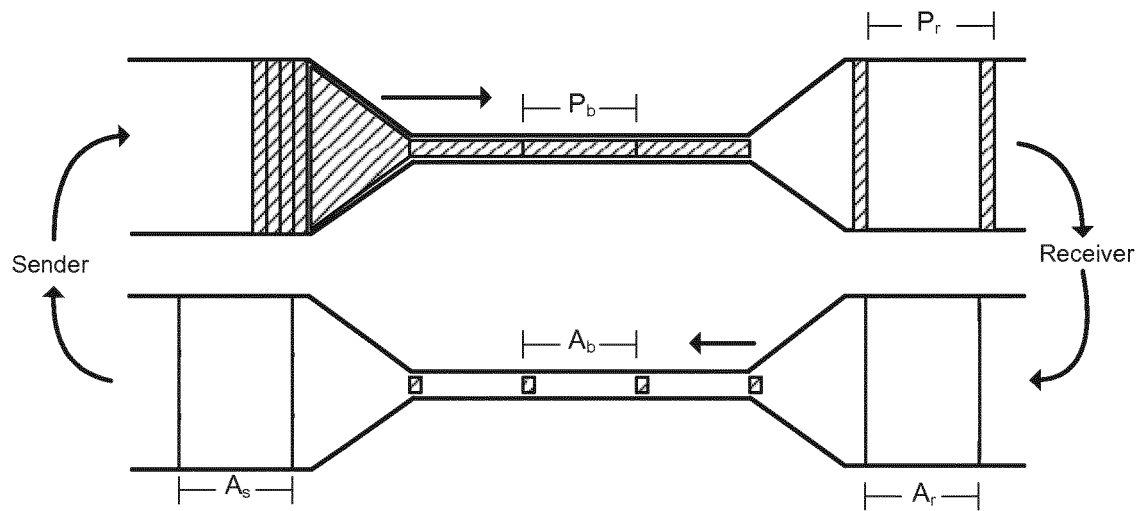
FIG. 8 is a schematic diagram illustrating the self-clocking characteristic of the present invention.

This self-clocking nature can be explained using the schematic diagram shown in FIG. 8. This diagram illustrates a sender and receiver node on high bandwidth networks connected by a relatively low bandwidth link (in the diagram, the vertical dimension represents bandwidth and the horizontal dimension represents time). The sender node sends a burst of packets (each shown in cross-hatch) back-to-back towards the sender. As the packets traverse the low-bandwidth link, the packet must spread out in time (as the number of bits in each packet remains the same). The time $P_b$ represents the minimum packet spacing on the slowest link in the path (i.e. the bottleneck). As the packets leave the bottleneck into the receiver's relatively high-bandwidth network, the inter-packet interval stays the same (i.e. $P_r=P_b$). The receiver node then sends an acknowledgement packet to the sender node at the same rate as the packets are received (assuming the processing time is negligible), and so the spacing between these acknowledgement packets is the same as the inter-packet interval (i.e. $A_r=P_r=P_b$). The acknowledgement packet is typically smaller than the original packets, so the acknowledgment packet should traverse the low-bandwidth link without any change in interval (i.e. $A_b=A_r$). Therefore, if any subsequent packets from the sender are sent only in response to receiving an acknowledgement packet, the spacing between the sender's subsequent packets will exactly match the bottleneck rate on the slowest link in the network.

Accordingly, as shown in FIG. 7, the server 18 continues to send the second batch of BE packets at this bottleneck rate. This happens until it receives an acknowledgement from the client 11 from the first packet of the second batch of BE packets. Thus, the last few packets sent from the server 18 in FIG. 7 are sent according to the rate at which these acknowledgment messages are received at the server 18.

The skilled person will understand that the first UQ acknowledgment message to arrive at the server 18 will indicate that some data has not arrived at the client 11 (due to some UQ packets being dropped). The server 18 therefore retransmits this data by including it in the second batch of BE packets. This behaviour therefore repairs all losses of data in the UQ packets. Once all this lost data has been retransmitted, the server 18 will send out any remaining new data until its buffered data has all been sent. The server will then terminate the connection (not shown).

The method of the present invention therefore uses the new UQ packets to probe the network and more rapidly establish the appropriate transmission rate of the end-to-end path through the network. This is clear when the algorithm of the present invention is compared to TCP Slow-Start for a larger data stream, as shown in FIGS. 9*a* and 9*b*.

Figure 9:
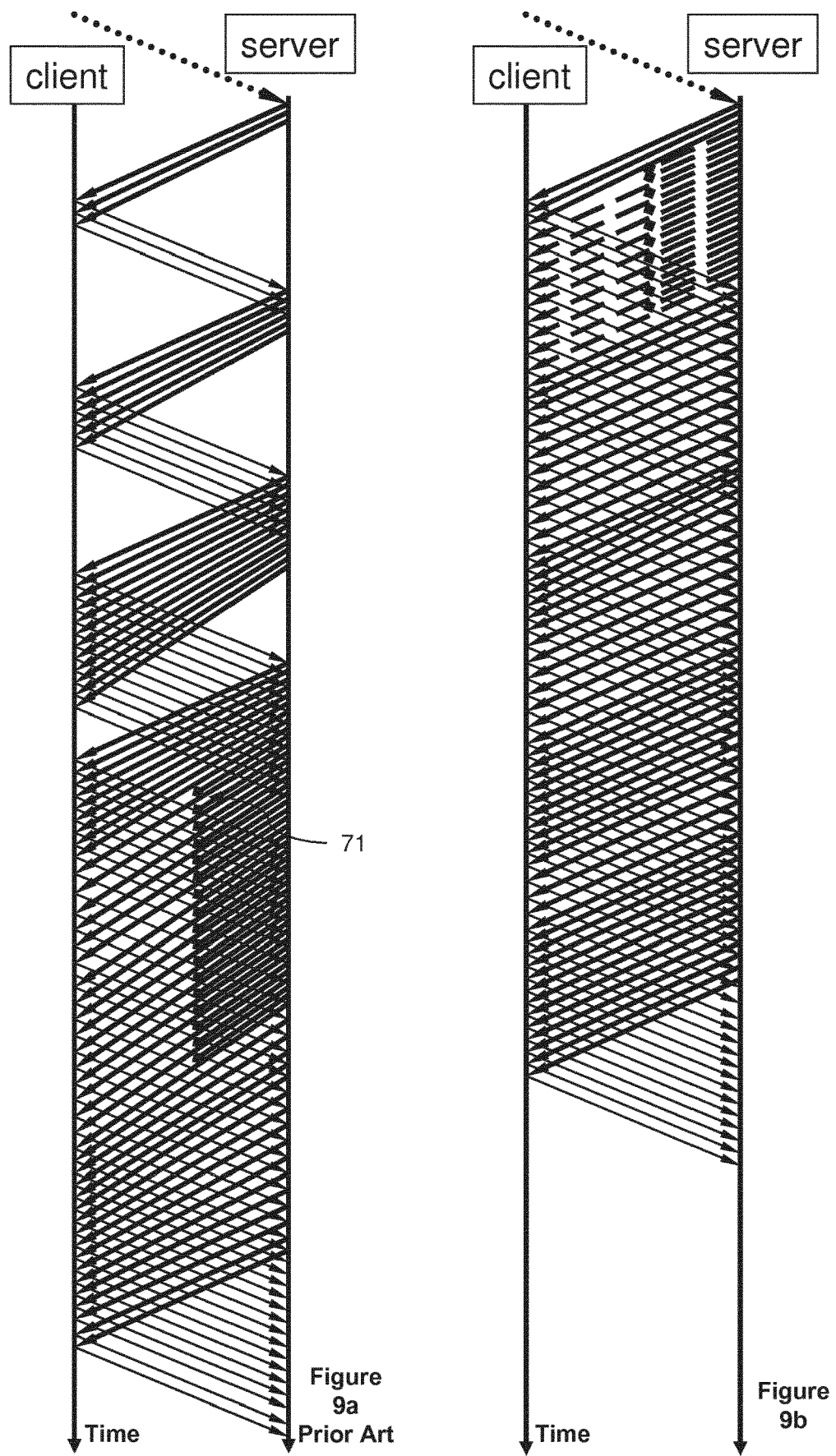
FIG. 9a is a timing diagram representing the TCP Slow-Start algorithm of the prior art for a large data flow.
FIG. 9b is a timing diagram representing the embodiment of the method of FIG. 7 for a large data flow.

FIG. 9*a* illustrates a TCP Slow-Start algorithm for a larger data stream. The algorithm starts in the same manner as described for FIG. 6, such that the client 11 sends a request to a server 18 and the transmission rate enters an exponential growth phase. FIG. 9*a* continues on from FIG. 6 as there are more data packets to transfer between the two end-systems. Each acknowledgment packet received by the server 18 causes its congestion window to increase by two packets, thus increasing the transmission rate between the server 18 and client 11. In the fourth transmission of packets from the server 18, the transmission rate is greater than the bottleneck rate in the network (e.g. at the second provider edge router), and the bottleneck router's buffer is full. Accordingly, the bottleneck router drops the packet (represented by the broken line having a diamond head (71)). Subsequently, about half of all the sent data packets will be discarded as the transmission rate reaches twice the bottleneck rate. This will continue until the acknowledgment of the first packet after the first dropped packet reaches the server 18. At this point, the server 18 determines that a loss has occurred and responds by halving the congestion window. It will then retransmit the data from the lost data packets before resuming sending new data until the transfer is complete.

It will be seen from FIG. 9*a* that this behaviour results in a large amount of data loss in the BE class when the transfer overshoots the bottleneck rate at the end of the exponential growth phase of the TCP Slow-Start algorithm. If other data flows share the same transmission path in this now congested part of the network, this overshoot will cause them to suffer the same proportion of loss as the illustrated flow.

FIG. 9*b* illustrates the same data transfer but using the method of the present invention. By comparing this data flow to the TCP Slow-Start algorithm of FIG. 9*a*, it can be seen that the method of the present invention suffers loss of data packets at the start of the data transfer. However, after the first round of data packets, the server 18 establishes the bottleneck rate of the network and (due to the self-clocking nature of the algorithm), and sends out future packets at this bottleneck rate. The method of the present invention therefore establishes the bottleneck rate of the network much more quickly than the TCP Slow-Start algorithm and achieves this without significantly overshooting the bottleneck rate (which would otherwise cause a significant drop of packets for the data flow and for other data flows).

Figure 10:
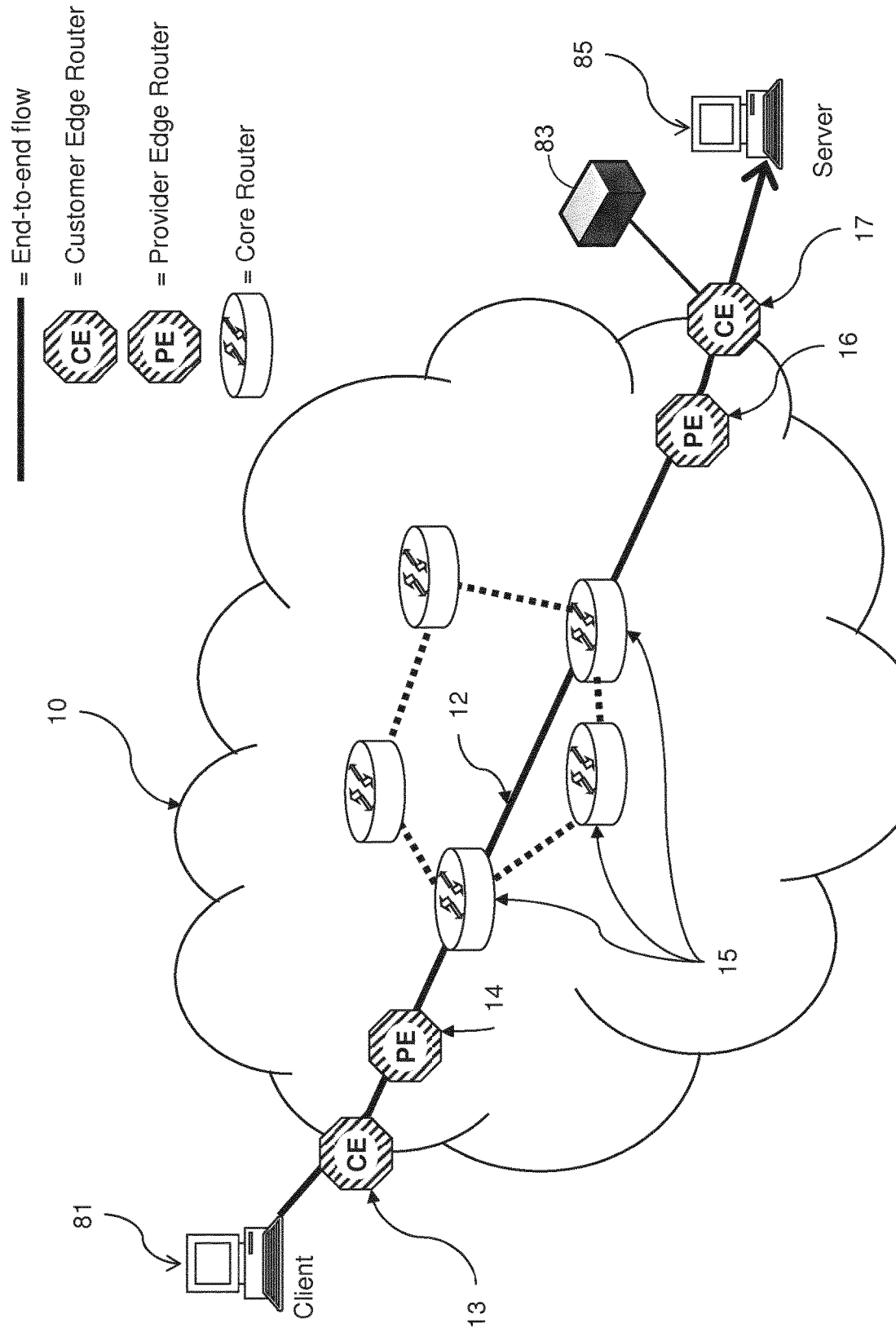
FIG. 10 is a schematic diagram of a communications network of a second embodiment of the present invention, illustrating a middlebox.

A second embodiment of the present invention will now be described with reference to FIGS. 10 and 11. This embodiment is substantially the same as that of the first embodiment. In this embodiment, a middlebox 83 (which may be provided as part of a Wide Area Network (WAN) Accelerator), is provided and connected to the second customer edge router 17. This middlebox 83 allows the network to take advantage of the unqueuable class of service, even if the client 81 and server 85 have not yet been adapted to send packets in the manner described in the first embodiment of the invention. This will now be explained, with reference to FIG. 11, which is also a timing diagram in which three time axes extend downwardly from the client 81, the middlebox 83 and the server 85. Again, various data packets are represented by arrows extending between the three time axes illustrating a data packet being sent or received by the client 81, middlebox 83 or server 85 (such that the root of an arrow represents the time the sender/receiver node sends a packet, and the head of the arrow represents the time the sender/receiver node receives the packet). Again, the data packets traverse several customer edge routers 13, 17, provider edge routers 14, 16 and core routers 15 (as illustrated in FIG. 1), but only the client, middlebox and server are shown for simplicity.

The client 81 sends a request packet 82 to the server 85 for a data transfer. In this embodiment, the middlebox 83 intercepts this request packet 82 (for example, by monitoring all data packets passing through the second customer edge router 17 and determining if any are request packets), and opens a connection back to the client 81. The middlebox 83 cannot yet send the data the client 81 has requested from the server, as it does not store it. The middlebox 83 therefore forwards the request onwards (84) to the server 85. The server 85 then starts a traditional TCP data transfer to the middlebox 83.

In this embodiment, the server 85 does not need to be modified in any way. The data transfer between the server 85 and the middlebox 83 can therefore proceed according to the traditional TCP Slow-Start algorithm, which is illustrated in FIG. 11 (reference 86). In this embodiment, the server 85 is in close proximity to the middlebox 83. The data transfer therefore accelerates up to full speed in much less time compared to a data transfer over a wide area network using the TCP Slow-Start algorithm (as depicted in FIG. 6).

Figure 11:
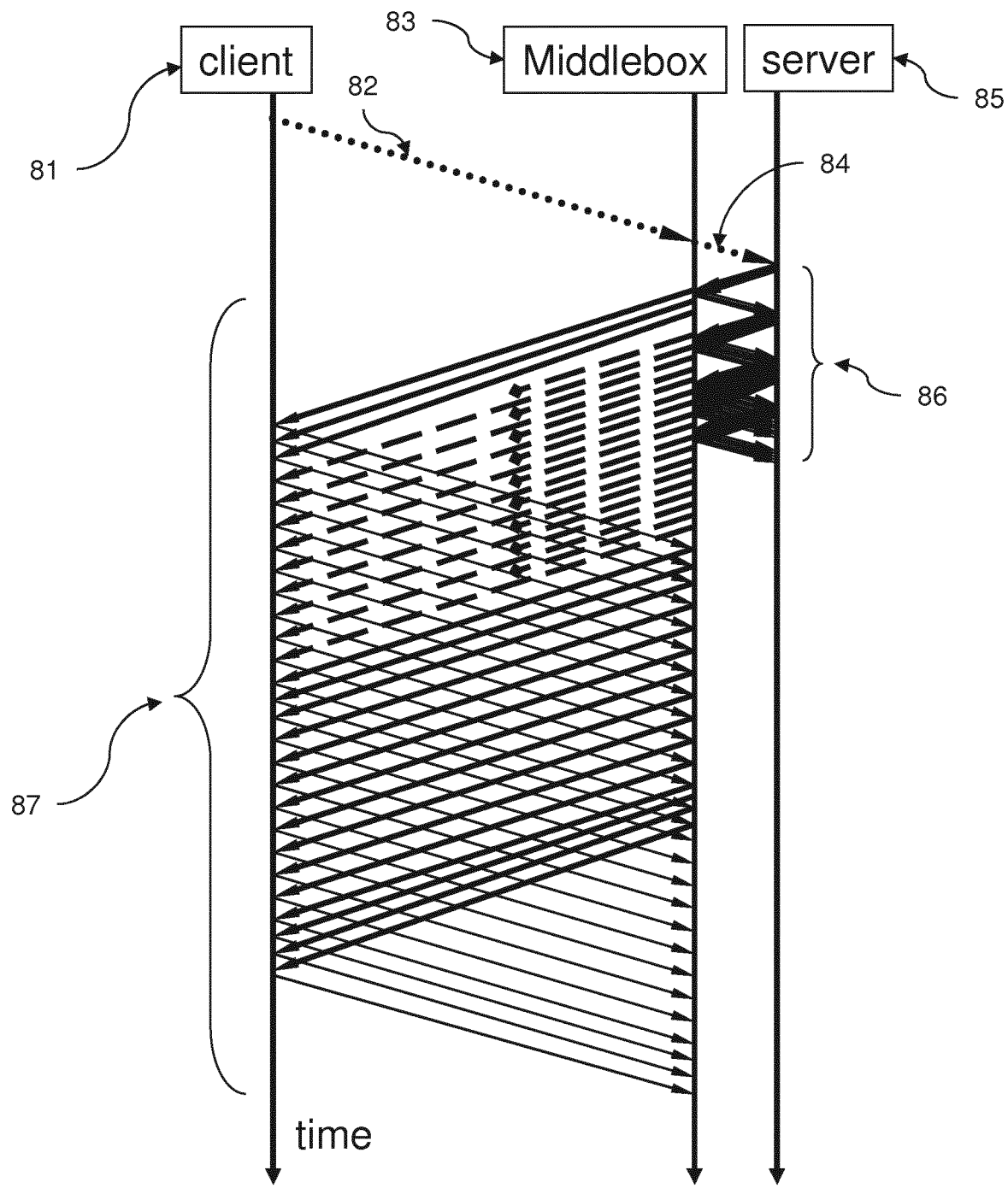
FIG. 11 is a timing diagram representing a second embodiment of a method of the present invention.

However, as can be seen in FIG. 11, once the middlebox 83 receives the stream of data packets from the server 85, it may initiate an unqueuable class of service data transfer as described in the first embodiment above. That is, the middlebox 83 may reclassify any data packet as an unqueuable packet (for example, by giving the packet the unqueuable class of service marking instead of the marking applied to the packet by the server 85), and send three data packets followed by a stream of UQ packets as described above.

The advantages of the second embodiment are that the traditional TCP Slow-Start exchange between the server 85 and the middlebox 83 may accelerate to a very fast rate in a relatively short of amount of time (compared to a traditional TCP exchange over a WAN), and then the data transfer is translated into a unqueuable class of service data transfer to establish the bottleneck rate over the WAN. This may also be implemented without any modifications to the server 85, such that only the nodes from the customer edge router onwards (which are maintained by network operators) need to be able to distinguish an unqueuable packet from a packet of any other class of service.

The skilled person would understand that the network could implement two middleboxes of the second embodiment, such that one is associated with the server and another is associated with the client, such that the advantages of the present invention could be realised in both the forward and reverse directions.

In an enhancement to the above embodiments, any intermediate node between the client and server could dequeue packets at a slightly lower rate than its normal transmission rate. In this manner, a greater number of UQ packets would be dropped by the intermediate node, and consequently the rate of UQ acknowledgment packets being returned to the server decreases. As these UQ acknowledgment packets clock out further packets from the server, the new transmission rate may be artificially lowered below the rate that would be established by the method outlined above. This can therefore provide a safer transmission rate, which is just less than the bottleneck rate of the network.

In another enhancement, a management entity could be connected to a node in the network (preferably the provider edge node), which may monitor data packets passing through the node to determine the proportion of packets which are being sent in the unqueuable class of service. This may be achieved by an interface with the header decoder function of the node, and appropriate logging mechanisms. Alternatively, deep packet inspection techniques could be used. The management entity allows the network operator to determine the usage of the unqueuable class of service by different clients and can thus help in deployment planning.

In the above embodiment, the server 18 transmits the packets towards the core network routers via customer edge and provider edge routers. However, this is non-essential and the skilled person would understand that the invention may be implemented between any two network nodes communicating via at least one intermediate node. For example, the server may be connected directly to a core router 15 (which may be the case, for example, where the server is a high-bandwidth storage server for popular video streaming websites). In this case, the bottleneck node is likely to be at a more distant intermediate node (such as a provider edge router associated with the client), and the bottleneck rate can be established by this node dropping the UQ packets. Furthermore, the two network nodes implementing the invention could be in a peer-to-peer arrangement, rather than a server/client arrangement detailed above.

In the above embodiments, the UQ packets are marked as unqueuable by a specific identifier in the header portion of the packet. However, the skilled person will understand that this method of ensuring a packet is unqueuable is non-essential. That is, the packets may be marked as unqueuable by using an identifier at any point in the packet, so long as any node in the network is able to decode this identifier. Furthermore, this marking does not necessarily need to be consistent, as a node may use deep packet inspection to determine the class of service without having to decode the identifier. The skilled person will understand that the UQ packet does not require any marking at all to be identifiable as of the unqueuable class of service. Instead, the unqueuable class of service may be inferred from a particular characteristic of the packet, such as its protocol, it being addressed to a particular range of addresses, etc. An intermediate node can then treat the packet as unqueuable based on this inference. Thus, the skilled person will understand that an 'unqueuable' data packet is one which network nodes generally understand should not be queued if a packet queue exists in the node In the above embodiments, the UQ packets include data that is part of the data to be transmitted from the server to the client, and any data lost as a result of a dropped UQ packet is resent by the server. However, the UQ packets may instead include dummy data (i.e. data which is not part of the data requested by the client, and typically just a random collection of bits). In this way, there are fewer packets of data which need to be retransmitted by the server.

The skilled person will also understand that the use of the TCP protocol is non-essential, and the present invention may be applied in many other transport protocols implementing congestion control, such as the Stream Control Transmission Protocol or Real-time Transport Protocol over Datagram Congestion Control Protocol.

The above embodiments describe the present invention operating between a server and client at the start of a new data flow. However, the skilled person will understand that the present invention may be used at any time in order to establish the bottleneck rate in the network. For example, the server may have established data flows with several clients, and one of the data flows may terminate. The server may then use the method of the present invention to quickly probe the network and establish the new bottleneck rate for its remaining data flow(s). Furthermore, the skilled person will understand that the second embodiment of the method of the invention, in which a middlebox is provided at an ingress and/or egress point of the core network, may be used to probe the network to determine a bottleneck capacity. Thereafter, when a new flow starts from a client associated with that middlebox, the transmission rate can be set based on this information.

In the above embodiments, the intermediate node is configured to determine that its buffer is empty once the final byte of data for the last packet leaves the transmitter. However, the skilled person will understand that the transmitter may also implement a buffer to temporarily store packets as they are transmitted. The node may therefore disregard any packets stored in this temporary transmitter buffer when determining whether or not the node buffer is empty and thus whether a new UQ packet can be queued or not.

The skilled person will understand that there are several ways in packets which are "unqueuable" may be realised. In the above embodiments, the unqueuable packets are received by the intermediate node and the intermediate node determines whether it is queuable or unqueuable, and if unqueuable, whether a packet queue exists at the node. If a packet queue exists at that time, the packet is discarded (e.g. it is deleted). However, it isn't essential for the packet to be discarded. In a more passive arrangement, the packet may just never be forwarded to its destination.

The skilled person will understand that any combination of features is possible within the scope of the invention, as claimed.

The invention claimed is:

1. A method of controlling packets in a data packet network, the data packet network including a source node, an intermediate node and a receiver node, the intermediate node having a receiver for receiving data packets from the source node, a buffer for storing data packets received from the source node and awaiting transmission, and a transmitter for transmitting data packets stored in the buffer to the receiver node, wherein the buffer has a maximum storage capacity, the method comprising the steps of:
    a source node marking a first set of packets as being of a first class of service, wherein when a data packet of the first set of packets is of the first class of service, the intermediate node receiving the data packet:
    enqueues the data packet to the buffer of the intermediate node if the buffer is empty, and
    never forwards the data packet to the receiver node if a buffer of the intermediate node is not empty and is at less than the maximum storage capacity;
    the source node sending the first set of packets to the receiver node over the data packet network via the intermediate node;
    the source node receiving a first acknowledgement of a first received packet of the first set of packets from the receiver node; and
    the source node sending a second set of packets to the receiver node over the data packet network.

2. A method as claimed in claim 1, further comprising the initial steps of:
    the source node sending an initial set of packets, before the first set of packets, to the receiver node over the data packet network via the intermediate node,
    wherein the initial set of packets are of a second class of service allowing the initial set of packets to be queued at the intermediate node.

3. A method as claimed in claim 2, wherein the rate the source node sends the first set of packets, belonging to the first class of service, is higher than the rate the source node sends the initial set of packets belonging to the second class of service.

4. A method as claimed in claim 1, wherein the first set of packets contain dummy data.

5. A method as claimed in claim 1, wherein the first acknowledgement indicates that a packet of the first set of packets was prevented from being forwarded to the receiver node; and the second set of packets includes a retransmission of said prevented packet, the second set of packets belonging to a second class of service.

6. A method as claimed in claim 1, further comprising the steps of:
    the source node receiving a second acknowledgement of a second received packet of the first set of packets from the receiver node, the first and second received packets of the first set of packets belonging to the first class of service;
    the source node determining a transmission rate between the source node and receiver node based on the rate the first and second acknowledgements are received at the source node;
    the source node transmitting the second set of packets to the receiver node based on the determined transmission rate.

7. A method as claimed in claim 1, further comprising:
    discarding the first set of packets of the first class of service upon determination that the buffer of the intermediate node is not empty and is at less than the maximum storage capacity; and
    storing received data packets belonging to a second class of service in the buffer upon determination that the buffer is not empty.

8. A method as claimed in claim 1, further comprising:
    discarding the first set of packets of the first class of service upon determination that the buffer of the intermediate node is not empty and is at less than the maximum storage capacity; and
    the source node retransmitting the discarded first set of packets as the second set of packets belonging to a second class of service.

9. A method of controlling a network node in a data packet network, the network node including a buffer having a maximum storage capacity, the method comprising the steps of:
    receiving a first data packet from a first external network node;
    analysing the first data packet to determine if the first data packet is of a first class of service that should be enqueued to the buffer if the buffer is empty and should never be forwarded to a receiver node if the network node's buffer is not empty and is at less than the maximum storage capacity; and, if so,
    determining if at least one data packet is stored in the network node's buffer and the network node's buffer is at less than the maximum storage capacity; and, if so, the first data packet is never transmitted.

10. A method as claimed in claim 9, wherein, if the first data packet is of the first class of service and no other data packets are stored in the network node's buffer, the first data packet is forwarded to a second external network node.

11. A method as claimed in claim 9, further comprising:
    discarding the first data packet upon determining that the first data packet belongs to the first class of service and upon determination that the buffer of the intermediate node is not empty and is at less than the maximum storage capacity; and storing received data packets belonging to a second class of service in the buffer upon determination that the buffer is not empty.

12. A method as claimed in claim 9, further comprising:
discarding the first data packet upon determining that the first data packet belongs to the first class of service and upon determination that the buffer of the intermediate node is not empty and is at less than the maximum storage capacity; and receiving retransmission of the discarded the first data packet as a second data packet belonging to a second class of service.

13. A network node for a data packet network, the data packet network including a source node, an intermediate node and a receiver node, the intermediate node having a receiver for receiving data packets from the source node, a buffer for storing data packets received from the source node and awaiting transmission, and a transmitter for transmitting data packets stored in the buffer to the receiver node, wherein the buffer has a maximum storage capacity, the network node comprising memory for storing instructions and a processor for executing the instructions such that the network node is at least configured to mark a first set of packets as being of a first class of service such that the intermediate node should enqueue a packet of the first set of packets to the buffer if the buffer of the intermediate node is empty and never forward a packet of the first set of packets to the receiver node if the buffer of the intermediate node is not empty and is at less than the maximum storage capacity;

send the first set of packets to the receiver node over the data packet network via the intermediate node;

receive a first acknowledgement of a first received packet of the first set of packets from the receiver node; and send a second set of packets to the receiver node over the data packet network.

14. A data packet network including a source node, an intermediate node, and a receiver node, the intermediate node having a receiver for receiving data packets from the source node, a buffer for storing data packets received from the source node and awaiting transmission, and a transmitter for transmitting data packets stored in the buffer to the receiver node, wherein the buffer has a maximum storage capacity, wherein the source node is at least configured to:

mark a first set of packets as being of a first class of service such that the intermediate node should enqueue a packet of the first set of packets to the buffer if the buffer of the intermediate node is empty and never forward a packet of the first set of packets to the receiver node if the buffer of the intermediate node is not empty and is at less than the maximum storage capacity;

send the first set of packets to the receiver node over the data packet network via the intermediate node;

receive a first acknowledgement of a first received packet of the first set of packets from the receiver node; and send a second set of packets to the receiver node over the data packet network.

15. A non-transitory computer-readable storage medium storing a computer program or suite of computer programs, which upon execution by a computer system performs the method of claim 1.

* * * * *